United States Patent [19]
Nicolai

[11] Patent Number: 5,612,607
[45] Date of Patent: Mar. 18, 1997

[54] METHOD FOR THE FAST CHARGING OF A BATTERY AND INTEGRATED CIRCUIT FOR THE IMPLEMENTATION OF THIS METHOD

[75] Inventor: Jean Nicolai, Chateauneuf le Rouge, France

[73] Assignee: SGS-Thomson Microelectronics S.A., Saint Genis Pouilly, France

[21] Appl. No.: 210,701

[22] Filed: Mar. 18, 1994

[30] Foreign Application Priority Data

Mar. 18, 1993 [FR] France ..................... 93 03153

[51] Int. Cl.$^6$ ..................... H01M 10/44; H01M 10/46
[52] U.S. Cl. ..................... 320/20; 320/30; 320/21
[58] Field of Search ..................... 320/21, 22, 23, 320/24, 30, 39, 40, 48, 20

[56] References Cited

U.S. PATENT DOCUMENTS 4,503,378  3/1985  Jones et al. .

FOREIGN PATENT DOCUMENTS

| 0005841 | 12/1979 | European Pat. Off. . |
| 0181112 | 5/1986 | European Pat. Off. . |
| 0444617 | 9/1991 | European Pat. Off. . |
| 0493226 | 7/1992 | European Pat. Off. . |

*Primary Examiner*—Edward H. Tso
*Attorney, Agent, or Firm*—David M. Driscoll; James H. Morris

[57] ABSTRACT

To carry out a fast charging of a battery, a high current is injected into this battery while, at the same time, the terminals of this battery are monitored. This injection is stopped when this voltage undergoes an inflection of its variation. It is shown that, given the security of the system, it is possible to charge nickel-cadmium or nickel-metal-hydride type batteries with currents that are even higher than in prior systems.

36 Claims, 4 Drawing Sheets

METHOD FOR THE FAST CHARGING OF A BATTERY AND INTEGRATED CIRCUIT FOR THE IMPLEMENTATION OF THIS METHOD

BACKGROUND OF THE INVENTION

1. Field of the Invention

The present invention relates to a method for the fast charging of a battery, in particular a cadmium-nickel (CdNi) type or nickel-metal-hydride (NiMh) type battery. However, this method can be useful for the fast charging of any type of battery if the charging characteristics of these batteries are similar. An object of the invention is also an improved integrated circuit capable of implementing the method of the invention.

To charge a CdNi or NiMh battery swiftly, a constant current must be injected into the battery. This current has to be all the greater as the charging needs to done swiftly. For example, a three-ampere current enables the charging of a one ampere-hour battery in slightly more than twenty minutes. The difficulty arises in determining when to stop the charging, it being known that a few minutes of overcharging reduces battery life through heating. A few tens of minutes of overcharging may put the battery out of operation or destroy it. The method of the invention makes it possible to stop the charging before the heating takes effect and hence before a state of overcharging occurs, this being achieved without the need for a costly temperature sensor.

2. Description of the Related Art

There are many existing methods to determine the end of the fast charging of a battery when it has reached its rated charging value. These methods are characterized by their reaction time after the end of the charging. This time should be as short as possible. These methods are also characterized by their reliability, repeatability and cost.

The most classic method used is the so-called delta-V or negative delta-V method. This method uses the characteristic curve of charging voltage of a battery, for example of the cadmium-nickel type. This curve is shown in FIG. 1a. When the battery is fully charged, or even slightly overcharged, the voltage falls slowly, after having risen continuously during the charging. This drop in voltage is detected by an electronic control circuit which then decides to stop the charging. It is possible, for example, to detect a twenty-millivolt negative delta V to stop the charging. In this case, the charging is stopped at the point A in FIG. 1a.

This method has two drawbacks. Firstly, when the voltage falls, the battery is slightly overcharged and its temperature has already started to rise. It is therefore already slightly late, for it is the heating that is the prime cause of the ageing of the batteries. This is all the more so as the charging is done speedily. The greater the current, the greater the overcharging and the overheating. Secondly, the batteries obtained by the new technologies, based on nickel-hydride, have a delta-V that is far less accentuated than that of cadmium-nickel batteries. This delta-V is therefore far more difficult to detect. Furthermore, these last-named batteries get heated to a far greater extent at the end of the charging and, hence, any overcharging is far more harmful to them. Notably, their life may be considerably shortened. The - delta V method is therefore inapplicable for nickel-hydride batteries and, furthermore, it shortens the life of cadmium-nickel batteries.

A more recent method consists of measuring the temperature of the battery and of deciding to stop the charging when the rate of increase of the temperature exceeds a certain threshold. Indeed, it is seen in FIG. 1d that the temperature remains constant almost throughout the entire charging operation. It starts rising towards the end with increasing steepness, notably in the last part of the curve. With this method for the measurement of temperature, the charging is stopped at a point B, at a point in time when the temperature rises at a speed that is greater than a certain rate fixed in advance.

One drawback of this method is that it calls for a temperature sensor in each battery as well as one or two contacts in addition to the battery/charger connection. This sometimes entails a prohibitive cost. A second drawback of this method is that the temperature is propagated slowly from the core of the battery to its periphery and then to the sensor. In other words, when the charging is stopped, the battery has already had the time to get excessively heated.

These characteristics are recalled in a description given in the article by Charles H. Small, "Nickel-Hydride Cells Avert Environmental Headaches" in the journal EDN, 10th Dec. 1992, pp. 156 to 161.

SUMMARY OF THE INVENTION

An object of the invention is to overcome the drawbacks referred to by proposing a method and an integrated circuit implementing this method that can be used to stop battery-charging operations before the point in time when an overcharging, or even an overheating, has been detected. The principle of the invention lies in the monitoring of the curve of the variation of the charging of a battery as a function of time. Indeed, it was observed in the invention that the voltage at the terminals of the battery rose with increasing speed and then, before reaching its maximum, started rising at lower speed. The idea then conceived was that of using not the voltage signal itself but rather a derivative, namely a variation of this voltage signal. So long as this derivative or this variation increases from one period to the next period, there is no risk to the battery. However, as soon as the inflection point of the voltage curve, namely the point I on the curve of FIG. 1, is crossed, the operation enters the danger zone. In practice, the instant of detection of this inflection of the voltage curve is used, and the charging is stopped, preferably with a calibrated delay measured with respect to this instant. In practice, preferably, the stopping is therefore prompted at the point C in FIG. 1a. It is seen that the point C is located on this characteristic curve before the point A and even before the point B of the prior art. The deterioration of the batteries is therefore smaller.

An object of the invention, therefore, is to provide a method for the fast charging of a battery including the following stages:
 the battery to be charged is subjected to a high charging current,
 the battery charging voltage is measured during this charging operation and a first measurement signal is obtained,
 the charging of this battery is stopped when this charging is at its rated value,
 wherein
  it is determined that the charging is at its rated value by identifying an instant at which a variation in voltage measured during a period becomes smaller than a variation in voltage measured during a preceding period.

An object of the invention also is to provide an integrated circuit to measure and control the fast charging of a battery, including a microprocessor related to a program memory wherein the program contained in this program memory includes instructions corresponding to the steps of the method.

BRIEF DESCRIPTION OF THE DRAWINGS

The invention will be understood more clearly from the following description and from the appended figures. These figures are given by way of example only and in no way restrict the scope of the invention. Of these figures.

DETAILED DESCRIPTION

Figure 2:
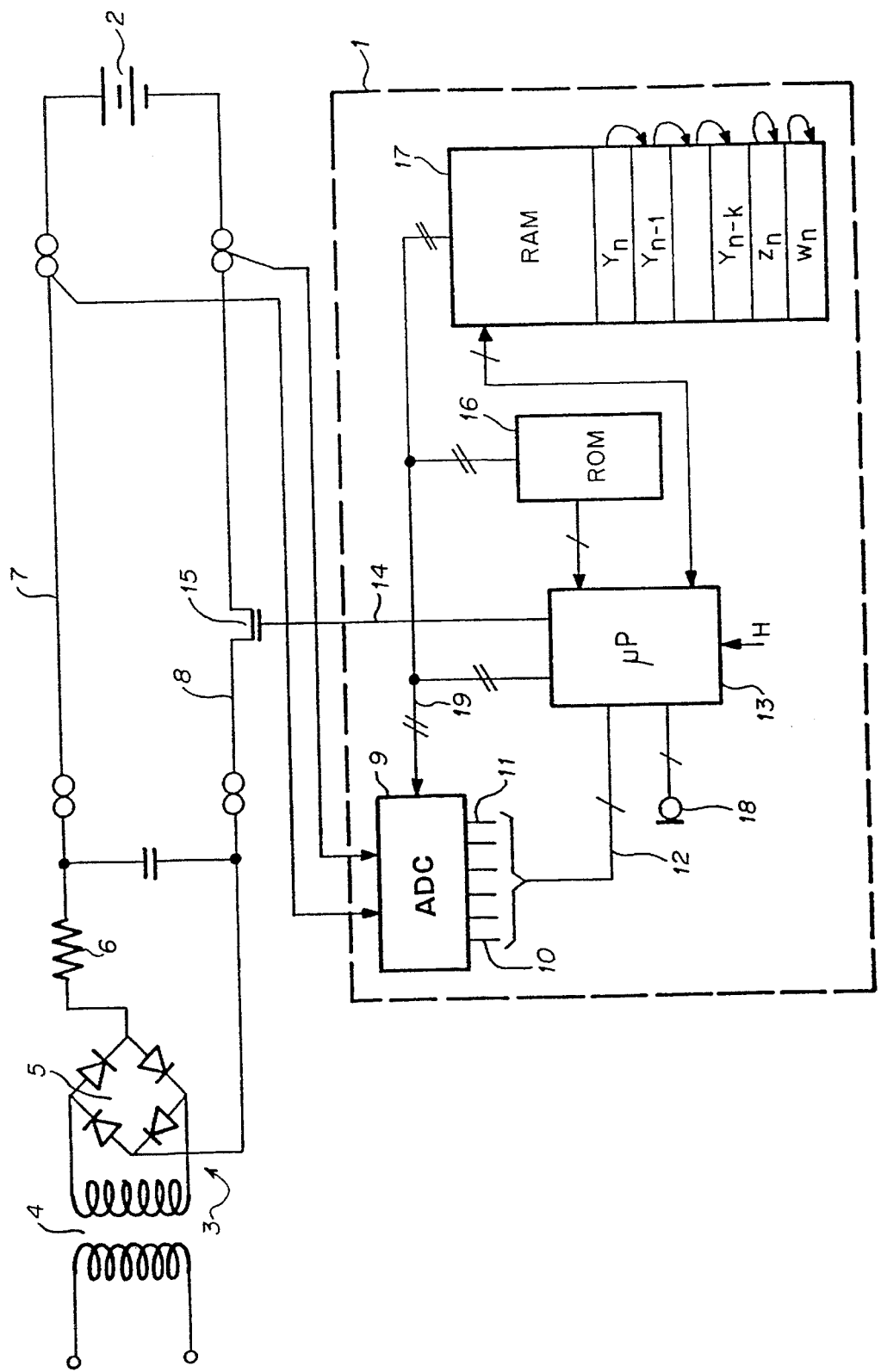
FIG. 2 is a schematic drawing of an integrated circuit that can be used to implement the method of the invention.
Figure 4:
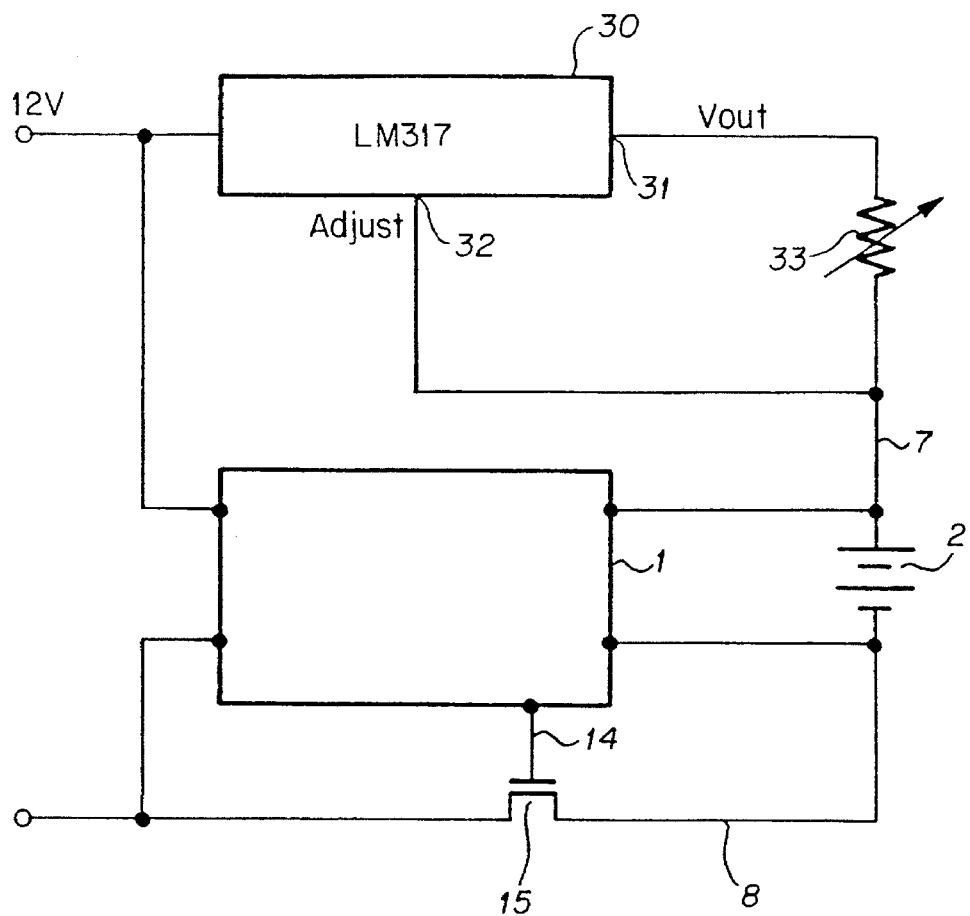
FIG. 4 is a drawing of a preferred circuit for the charging of the battery at constant current.

FIG. 2 shows an integrated circuit that can be used to implement the method of the invention in order to charge a battery 2 from a current source 3. The current source 3 is herein shown schematically with a transformer 4, a rectifier bridge 5 and a filter 6. FIG. 4 shows a preferred variant of an embodiment of a circuit that provides a high and constant charging current. The battery 2 is connected by connections 7 and 8 to the current source 3.

In the invention, an analog-digital converter 9 is used to make periodic measurements of the battery charging voltage while the battery is being charged. This voltage is picked up, for example, by the connection of the analog-digital converter 9 to the connections 7 and 8. The analog-digital converter 9 produces a measurement signal in binary code available at its outputs 10 to 11. The outputs 10 to 11 of the analog-digital converter 9 are connected by a bus 12 of the integrated circuit to a microprocessor 13 that manages the measurements and produces a signal to stop the charging when the charging is at a rated value.

This signal to stop the charging is, for example, a logic level available at a connection 14 coming out of the microprocessor 13 and leading to a pass transistor 15 interposed in one of the connections 7 and 8. Other circuits may be used to stop the charging: the one shown is given purely by way of example. Alternatively, the rectifier 5 may be a rectifier controlled by the microprocessor 13 in which case, when the time comes to stop the chanrging, this rectifier 5 can be invalidated.

The microprocessor 13 is linked to a non-volatile (ROM) type program memory 16. This memory 16 contains instructions corresponding to the execution of the steps of the method. When the unit is turned on, the microprocessor 13 can transfer the instructions contained in the memory 16 into a random-access type working memory 17 which is also connected to the microprocessor 13. Depending on the type of microprocessor used, it could also be capable of carrying out the instructions read directly in the non-volatile memory 16. The volatile random-access memory 17 furthermore comprises a set of registers that can be used to store the values of working variables prepared at different stages of the method.

The microprocessor 13 can finally be connected to an alarm circuit 18 comprising, for example, a light or a loudspeaker. The microprocessor 13 receives a clock signal H and also sends out commands, on a control bus 19, intended for the memories 16 and 17 and for the analog-digital converter 9. In particular, the setting of the rate of the sampling carried out by the analog-digital converter 9 is prompted by the microprocessor 13. In one example, this rate is set at about one measurement per second.

Figure 3:
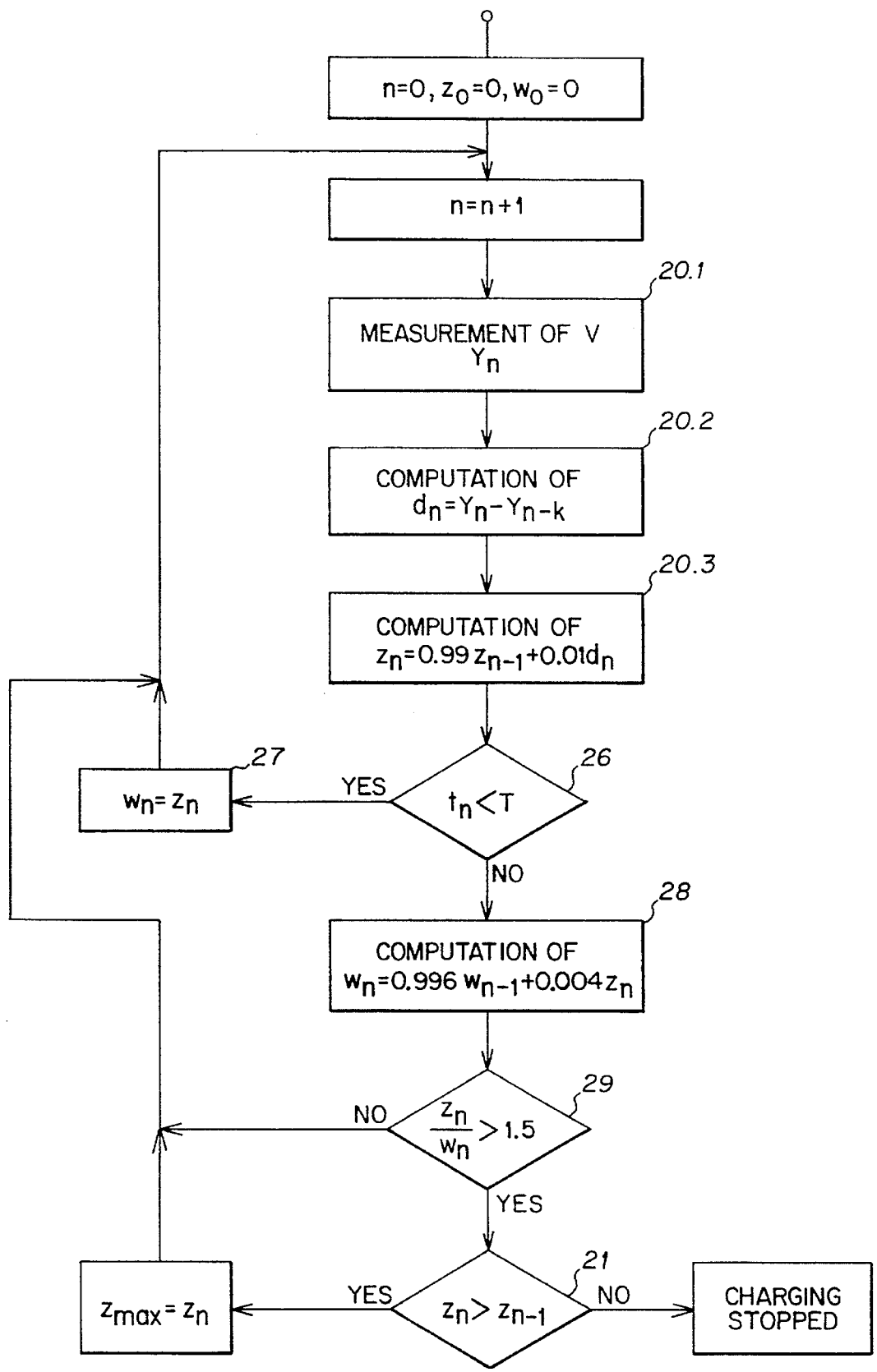
FIG. 3 is a flow chart of the operations to be implemented in a preferred variant of the method of the invention.

FIG. 3 shows the main steps of a preferred embodiment of the method of the invention. The method starts with an initialization of the variables pertaining to the state of the system. In particular, an index n, identifying the temporal rank or order of each of the samples as well as two variables z and w whose meaning shall be explained hereinafter, will be set at zero. The initialization is not necessarily an initialization at a zero value. The notion of rank or order is furthermore not indispensable. It is useful only if it is desired, in the working memory 17, to limit the number of status registers that are to be used. The setting of the rate of the analog-digital converter 9, as well as the sequence of all the operations shown in FIG. 3, corresponds at each time to a given value of the rank. The processing operations are concluded in the duration, equal to approximately one second, between each measurement and the next one.

First of all, the analog-digital converter 9 samples the measurement of the voltage V at the step 20.1 and produces a first digitized measurement signal $Y_n$. In one step 20.2 following the step 20.1, a computation is made, on the basis of $Y_n$, of a derivative or pseudo-derivative $d_n = Y_n - Y_{n-k}$. The signal $d_n$, called a second signal, is shown in FIG. 1b. The signal $d_n$, which represents the variation of the battery voltage, has a stepped form due to the quantification of the analog-digital converter 9. This signal cannot easily be used in view of its erratic nature. However, it is possible to conceive of using it in such a way that, to identify its maximum corresponding to the inflection point I of FIG. 1a, it would suffice to identify the point of time at which this signal $d_n$ becomes greater than a predetermined threshold.

The constant k is, for example, fixed at 10. The second signal thus prepared, $d_n$, represents the variation of the charging voltage during a period. The duration of this period is k samples. It is not exactly a derivative, but a simple approximation which furthermore has the advantage of being easily computed by the microprocessor since there is only one subtraction to be made. A division by k is omitted since k is constant from one end of the method to the other. The value k may be chosen as a function of the type of batteries to be charged.

With the aim of computing $d_n$, the last k samples measured $Y_n$ to $Y_{n-k}$, will be stored permanently in the memory 17. When a new sample is measured, it takes the place of the last sample $Y_n$ measured. This last sample takes the place of the sample $Y_{n-1}$, and so on and so forth, with the former sample $Y_{n-k}$ disappearing. This is shown schematically in FIG. 2 by means of arrows for shifting the content of the registers of the memory 17. In practice this can be done differently, by quite simply modifying the addresses of the useful registers.

The signal $d_n$ is noise-ridden owing to the quantification in the analog-digital converter 9. The problems of quantification are resolved by smoothing the derivative to obtain a smoothened derivative that is easier to exploit. This smoothing corresponds to a damping applied to the quantified signal so as to produce a third signal $z_n$ shown in FIG. 1c. The signal $z_n$ is obtained during a step 20.3 following the step 20.2 wherein the following computation is made: $z_n=0.99z_{n-1}+0.01d_n$. This method gives a smoothing by computation of the mean of the derivative $d_n$.

Figure 1A:
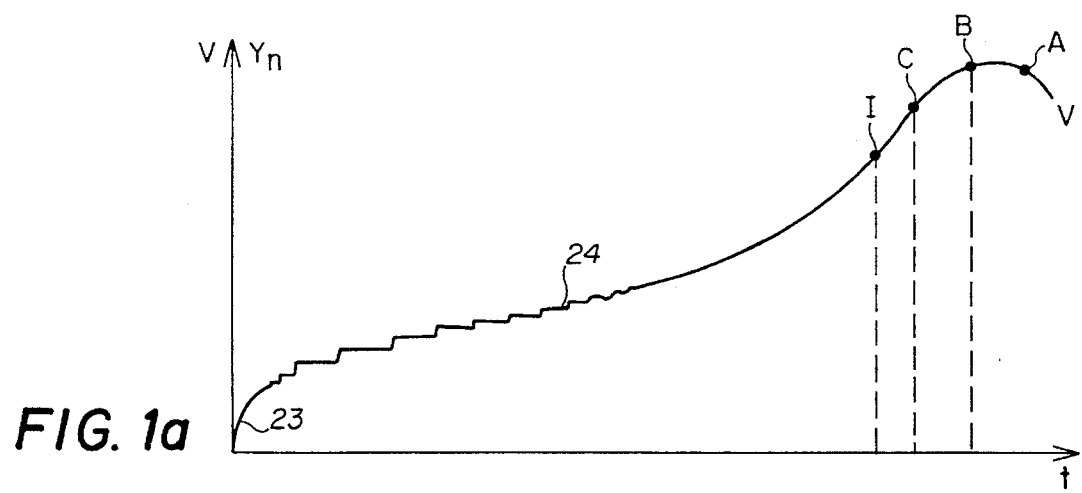
FIG. 1a shows a characteristic curve of the charging voltage of a cadmium-nickel type battery already referred to hereabove.
Figure 1B:
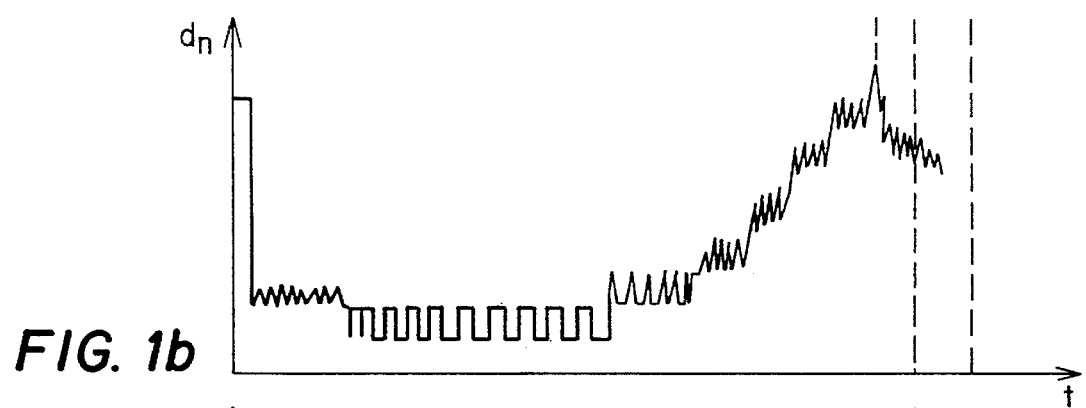
FIG. 1b shows a representation of the variation in battery voltage (and no longer of the signal of the battery voltage itself) after being digitized.
Figure 1C:
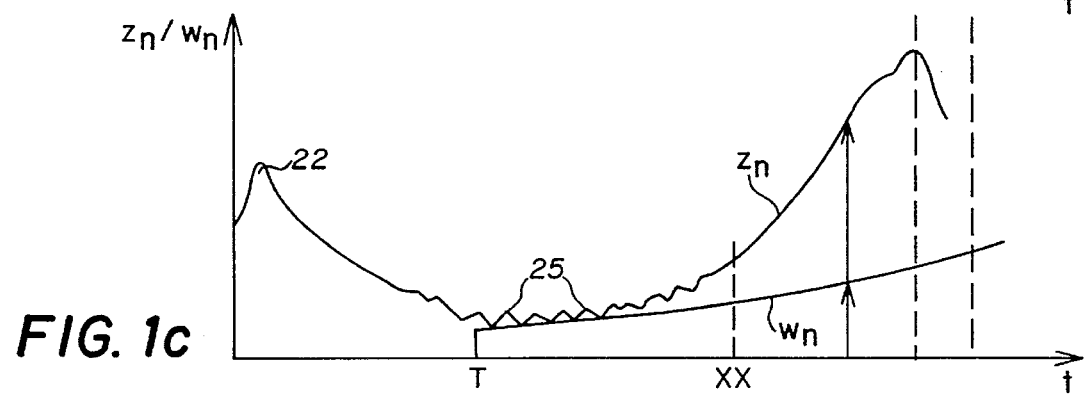
FIG. 1c shows the result of a filtering processing operation applied to the digital measurement of the variation of the voltage for the extraction therefrom of a signal that can be used in a preferred way.
Figure 1D:
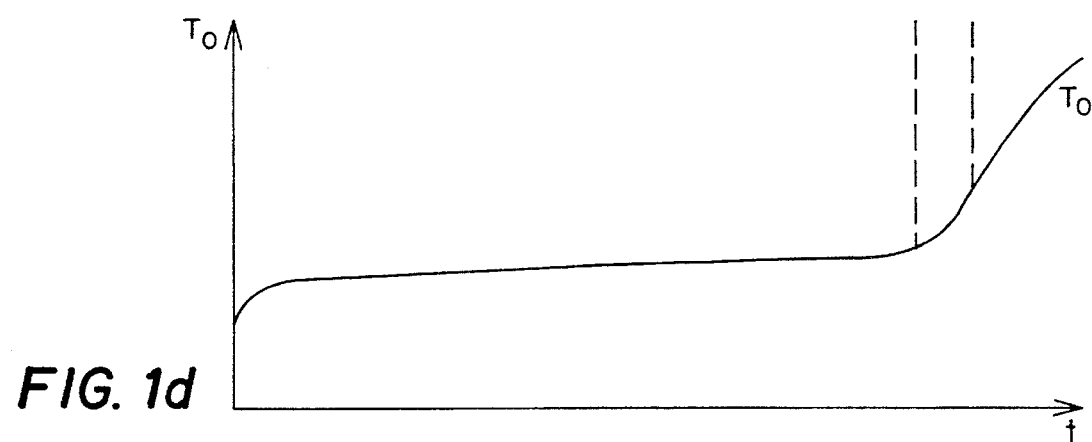
FIG. 1d shows the characteristic curve of the change in temperature of the battery during the charging operation.

Since the inflection point I of the curve of FIG. 1a is to be detected, the peak, namely the extreme value, of the signal $z_n$ (FIG. 1c) will be detected. This is done during a test 21 during which the $z_n$ that has just been computed is permanently compared with the preceding $z_n$ and stored in a register.

So long as the new value computed for $z_n$ is greater than the previous value $z_{n-1}$, the maximum has not been reached. In this case, in the register $z_{max}$ of the memory 17, the memorized value $z_{n-1}$ is replaced by the new computed value $z_n$. On the other hand, when the peak has been crossed, the result of the test 21 becomes negative and, in this case, the charging is stopped by sending out the appropriate logic command on the connection 14. It is observed, in practice, that the instant at which the maximum is detected is slightly delayed with respect to the instant at which the point of inflection of the voltage has appeared. This is due to the smoothing of the derivative. In practice, the computation that has been indicated prompts a delay by a hundred samples. It is possible, by modifying the computation of the step 20.3 and/or the frequency of scrutiny by the analog-digital converter 9, to modify this delay in detection. It would seem, however, that the duration of a hundred seconds forms an acceptable compromise and, in any case, enables a stop to be triggered before the point B.

The triggering, thus described, of a stop in the charging is automatic when the operation is in the significantly straight part of the curve of the voltage V. There may arise a problem of distinguishing the peak of the smoothened derivative $z_n$, corresponding to point C, from, firstly, a peak 22 located at the very beginning of the curve and, secondly, many other local maximum points located in the median part of the curve. The peak 22, located at the beginning of the curve, is created by the conditions of initialization of the variables at zero at the beginning of the charging and by a decrease in the slope of the battery voltage at the beginning of the charging operation. Indeed, during the first seconds of connection, the voltage at the terminals of the battery rises very swiftly (this is the rise referenced 23 in FIG. 1a). Then it falls again giving rise, in passing, to the peak 22 of the derivative. The local maximum values 25, for their part, result from the quantification of the analog-digital converter 9 in a zone where the slope of the curve of the charging voltage is constant (zone 24 in FIG. 1a).

To eliminate these problems and make the entire process automatic instead of only its end, two operations are performed. Firstly, during a test 26 carried out after the step 20.3, it is ensured that the duration from the beginning of the charging is greater than a basic duration T. For example, the basic duration T will be equal to a hundred seconds, equal to hundred times the duration between two successive samples. So long as this duration has not been reached, a computation is made of a variable $w_n$ corresponding to a fourth signal according to a mode expressed in the step 27: $w_n=z_n$. This makes it possible to avoid transient phenomena that occur at the start of the charging operation.

Then, after this beginning of the charging operation, the computation of the variable $w_n$ is undertaken as indicated in the step 28, in seeing to it that $w_n$ is equal to:

$0.966 w_{n-1}+0.004 z_n$

In practice, the computation is done only if $w_n$ is smaller than $z_n$. If this is not so, $w_n$ is replaced by $z_n$ for the rank of operations considered.

This amounts to the filtering, on about a thousand samples, of the value of the derivative (while keeping only k samples in the memory). The fact of applying the step 27 beforehand enables the arbitrary fixing of the highly dampened derivative $w_n$ very swiftly at a significant value without having to wait for it to rise to this value. It is then ascertained that the operation is located in a significant part of evolution of the voltage V by carrying out a comparison, during a test 29, of the smoothened derivative $z_n$ (third signal) with the highly dampened signal $w_n$ (fourth signal). This comparison is made in the form of a ratio. So long as the derivative does not exceed the long-term mean derivative by more than fifty per cent, it shall be assumed that the test 29 is negative and the charging will be allowed to continue. The value of fifty per cent has been chosen but clearly another ratio could have been chosen, for example twenty-five per cent or even possibly seventy or eighty per cent. If need be, this test could be used to stop the charging.

As soon as the result of the test 29 becomes positive, the operation is in the significant stage of measurement and it is possible, by carrying out the test 21, to identify the maximum value $z_n$. Indeed, it is assumed that when the test 29 is positive, the battery voltage has entered a phase of speedy increase of its slope. This occurs only in this zone of the charging curve, whatever may be the type of battery. This makes it possible to isolate the period, located to the right of a duration XX, starting from which the smoothened derivative $z_n$ no longer has any local maximum values or other singular features. It is therefore easy, starting from this point, to detect the peak of this smoothened derivative.

In the invention, in order that the flow chart of FIG. 3 may work as efficiently as possible, it is preferable to have a source of current that does not vary with the voltage put through, or with time, or with the temperature of the supply circuit. FIG. 4 shows a preferred exemplary embodiment of a current source such as this that is stable in time and independent of the variation of the supply voltage. A voltage-stabilized supply (not shown) provides a 12-volt supply to the integrated circuit 1 as well as to a circuit 30 of the LM 317 (by SGS THOMSON MICROELECTRONICS) type. This circuit 30 has two outputs 31 and 32, called Vout and Adjust, between which an adjusting resistor 33 can be parallel-connected. The resistor 33 enables the imposing, on the battery 2, of a voltage available at the output 32 and a current equal to the ratio of the voltage difference between the outputs 31 and 32 to the value of the resistor 33. The circuit LM 317 dictates a voltage Vout-Vadjust equal to a reference of 1.27 volts. Hence, the constant current is equal to I=1.27/value of resistor 33

What is claimed is:

1. A method for fast charging of a battery comprising the steps of:

applying a charging current to the battery;

measuring a battery voltage during the step of applying and obtaining a first measurement signal therefrom;

generating a second signal, representing a variation of the battery voltage during a period;

determining when the battery voltage is at a rated value by identifying an instant at which the battery voltage measured during a period increases at a lower rate of change than during a preceding period; and stopping the charging of the battery responsive to the battery voltage reaching the rated value;

wherein the step of determining that the battery voltage measured during a period increases at a lower speed than during a previous period, further includes the steps of:

dampening the second signal for a first time to generate a third measurement signal;

dampening the third measurement signal, to generate a fourth measurement signal; and verifying that a ratio of the third measurement signal to the fourth measurement signal is greater than a threshold value before performing the step of determining; and detecting a point of time when the third measurement signal passes through an extreme value.

2. The method according to claim 1 wherein the step of determining that the voltage measured during a period is increasing at a lower speed than during a pervious period further includes waiting for a certain number of periods to expire before performing the determining step.

3. The method according to claim 1 wherein the step of applying a charging current to the battery includes applying a strictly constant current.

4. The method according to any of the claims 1 to 3 wherein the step of measuring includes periodically measuring the battery charging voltage.

5. A method according to claim 4, wherein the step of determining that the battery is charged to the rated value completes its determination a number of periods after the second signal passes through an extreme value.

6. A method for charging a battery, comprising the steps of:

applying a charging current to the battery;

measuring, at a predetermined period, a voltage across the battery that changes in response to the applied charging current to generate a succession of measurement values;

computing a succession of difference values each indicative of a difference between a pair of measurement values;

dampening the difference values a first time to generate a first-dampened succession of difference values;

searching, responsive to at least one condition, for an extreme value of the first-dampened succession of difference values;

identifying the extreme value; and stopping the charging of the battery responsive to an identification of the extreme value by the step of identifying.

7. The method of claim 6, wherein the step of searching includes comparing a present first-dampened difference value to a previous first-dampened difference value, and wherein the step of identifying includes determining that the present first-dampened difference value exceeds the previous first-dampened difference value.

8. The method of claim 6, wherein the at least one condition in the step of searching includes waiting a prescribed number of the predetermined periods before beginning the step of searching.

9. The method of claim 6, further including the step of dampening the first-dampened succession of difference values to generate a second-dampened succession of difference values.

10. The method of claim 9, wherein the at least one condition in the step of searching includes verifying that a ratio of a first-dampened difference value to a second-dampened difference value exceeds a predetermined threshold.

11. The method of claim 10, wherein the predetermined threshold has a value between 1.25 and 1.8.

12. The method of claim 9, wherein a present second-dampened difference value is computed as a weighted sum of a previous second-dampened difference value and a present first-dampened difference value.

13. The method of claim 12, wherein the previous second-dampened difference value is weighted more heavily than the present first-dampened difference value in the weighted sum.

14. The method of claim 13, wherein the previous second-dampened difference value is weighted two hundred forty-nine times more heavily than the present first-dampened difference value in the weighted sum.

15. The method of claim 14, wherein an initial value of a first second-dampened difference value is zero.

16. The method of claim 6, wherein each difference value is computed as a difference between a present measurement value and a previous measurement value that occurred a number of measurements previously.

17. The method of claim 7, wherein a first-dampened difference value is computed as a weighted sum of a previous first-dampened difference value and a present difference value.

18. The method of claim 17, wherein the previous first-dampened difference value is weighted more heavily than the present difference value in the weighted sum.

19. The method of claim 18, wherein the previous first-dampened difference value is weighted ninety-nine times more heavily than the present difference value.

20. The method of claim 19, wherein an initial value of a first first-dampened difference value is zero.

21. The method of claim 6, wherein the step of measuring the voltage across the battery includes digitizing the voltage across the battery using an analog-to-digital converter.

22. An apparatus for charging a battery, comprising:

means for applying a charging current to the battery;

first means for generating a succession of measurements of battery voltage, the battery voltage varying in response to the applied charging current;

second means for generating a succession of difference values each indicative of a difference between a pair of battery voltage measurements;

third means for generating a succession of first-dampened difference value each indicative of a previous first-dampened difference value and a present difference value;

means for detecting an extreme point in the succession of first-dampened difference values, at which the first-dampened difference values change from an increasing trend to a decreasing trend; and means, operative in response to a detection by the means for detecting, for stopping the charging current.

23. The apparatus of claim 22, further comprising:

means for delaying the means for detecting a predetermined period of time so that at least one extreme point associated with an initial state can be ignored by the means for detecting.

24. The apparatus of claim 22, further comprising:

means for generating a succession of second-dampened difference values each indicative of a previous second dampened difference value and a present difference value.

25. The apparatus of claim 24, further comprising:

means for delaying the means for detecting until a ratio of a present first-dampened difference value to a present second dampened difference value exceeds a predetermined threshold.

26. The apparatus of claim 25, wherein the predetermined threshold has a value between 1.25 and 1.8.

27. The apparatus of claim 23, further comprising:

means for generating a succession of second-dampened difference values each indicative of a previous second dampened difference value and a present difference value and for delaying the means for detecting until a ratio of a present first-dampened difference value to a present second dampened difference value exceeds a predetermined threshold.

28. The apparatus of claim 22, further comprising means for storing the succession of measurements of battery voltage.

29. The apparatus of claim 28, wherein the means for storing stores a number of measurements of battery voltage that does not exceed a number required to compute each one of the succession of difference values.

30. The apparatus of claim 22, further comprising processor control means for coordinating the means for applying, the first, second, and third means for generating, the means for detecting, and the means for stopping.

31. The apparatus of claim 22, further comprising alarm means for indicating when the battering charging has stopped.

32. The apparatus of claim 22, wherein the means for applying includes a switch coupled to a power supply.

33. An integrated circuit for controlling the charging of a battery, comprising:

measurement means for generating a sequence of battery voltage measurements;

memory means for storing the battery voltage measurements;

nonvolatile memory means for storing a list of program instructions; and processor means for reading the list of programming instructions from the nonvolatile memory and for controlling the measurement means;

wherein the processor means further includes:

means for computing a succession of difference values each indicative of a difference between a pair of battery voltage measurements;

means for smoothing the difference values to generate a sequence of first-dampened difference values;

means for identifying an extreme value in the first-dampened difference values; and means, operative in response to identifying the maximum value, for issuing a command to stop the charging of the battery.

34. An apparatus for charging a battery, comprising:

an adjustable voltage regulator having an input terminal coupled to a power supply, a output terminal, and an adjust terminal, the adjust terminal being coupled to a first terminal of the battery;

an impedance, coupled between the output terminal and the adjust terminal, for selecting a constant current that couples from the adjustable voltage regulator to the battery;

a switch, responsive to a control signal, for alternately conducting and blocking the constant current; and an integrated circuit coupled to the battery, for monitoring the voltage across the battery, and for issuing the control signal to block the constant current when the battery becomes fully charged.

35. The apparatus of claim 34, wherein the integrated circuit further comprises:

measurement means for generating a sequence of battery voltage measurements;

memory means for storing the battery voltage measurements;

nonvolatile memory means for storing a list of program instructions; and processor means for reading the list of programming instructions from the nonvolatile memory and for controlling the measurement means.

36. The apparatus of claim 35, wherein the integrated circuit further includes:

means for computing a succession of difference values each indicative of a difference between a pair of battery voltage measurements;

means for smoothing the difference values to generate a sequence of first-dampened difference values;

means for identifying a maximum value in the first-dampened difference values; and means, operative in response to identifying the maximum value, for issuing a command to stop the charging of the battery.

\* \* \* \* \*